Aug. 5, 1952      C. E. PERRY      2,606,230
ELECTRICAL RESISTANCE MEASURING INSTRUMENT
Filed Nov. 5, 1948
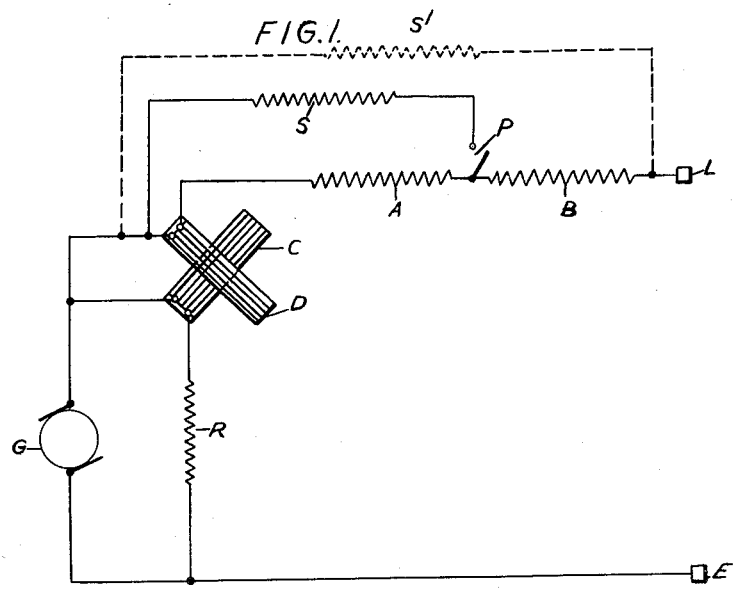
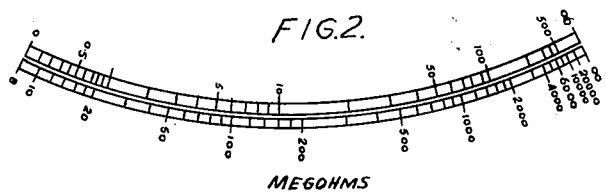
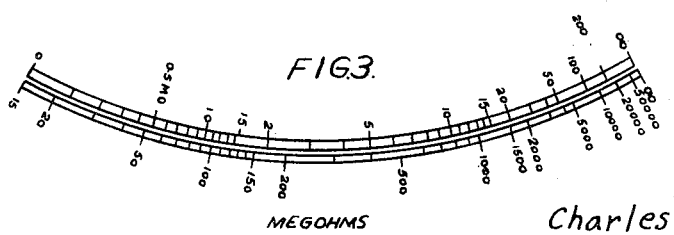
Inventor
Charles E. Perry
By
Ralph B. Stewart
Attorney

UNITED STATES PATENT OFFICE 2,606,230

ELECTRICAL RESISTANCE MEASURING INSTRUMENT

Charles E. Perry, London, England, assignor to Evershed and Vignoles Limited, London, England, a British company Application November 5, 1948, Serial No. 58,438
In Great Britain November 14, 1947

4 Claims. (Cl. 175—183)

This invention relates to electrical instruments for the measurement of resistance and particularly for the measurement of high resistance such as is effected by insulation testers. Such instruments can be supplied from any convenient source of direct current potential such as a battery or a hand-driven generator and generally a crossed-coil movement is employed so that the instrument is a ratiometer instrument. The control coil is usually connected across the supply voltage in series with a resistance and the deflecting coil is connected to the source of supply in series with a limiting resistance in the instrument and with the terminals to which the resistance to be measured is connected. Furthermore, such instruments are often made to operate on more than one range, the range for measuring lower resistances being obtained by shunting the deflecting coil and all of the internal resistance in series with it in the instrument by a resistance of suitable value.

The useful part of the lower range is that including resistance lower than those which can be measured on the upper range. It is therefore advantageous to make this part of the lower range a large proportion of the total, or in other words to make the overlap between the two ranges small. In a particular case, the upper range may extend from 10 megohms to infinity and the useful part of the lower range will then lie between zero and 10 megohms. In order to make the overlap between the two ranges small, the multiplying effect resulting from a change of connections provided to yield the lower range should be large and this depends on the ratio between the current flowing through the resistance being measured and that flowing through the deflection coil, that is to say, the shunt ratio. For a given deflection of the coil, and hence for a given current flowing in it, the current flowing in the resistance being measured increases with the shunt ratio and the greatest shunt ratio obtainable is therefore governed by the greatest current permissible in the instrument. This is limited either by the excessive heat generated, or, when the instrument is supplied from a hand generator, by the difficulty in turning it.

However, the tendency more and more is to operate with high voltages and, of course, the instrument has to be able to function if the output terminals are short-circuited or connected by quite a small resistance. Under these conditions, the usual method of shunting, that is to say by shunting the deflecting coil and the whole of the internal resistance in series with it, is liable to become of little value as it is able to provide only a very small shunt-ratio without exceeding the maximum permissible load current. For example, in a usual form of instrument, the internal resistance in the deflecting circuit may be 2 megohms and the maximum permissible load current, governed by the considerations already referred to, may flow when the resistance of the deflecting circuit is 66,667 ohms. In this particular example, the lowest permissible value of a resistance shunting the deflection coil and its associated limiting resistance would be given by $$\frac{1}{\frac{1}{.667}-.5} = 1.0 \text{ megohm}$$

and this would give a shunt-ratio of 3:1.

Referring to Figure 2 of the accompanying drawings which will be described in detail below, the lower scale is typical of that obtained with this class of instrument when used unshunted. It will be observed that it extends from 8 megohms to infinity. If, however, the instrument were to be shunted in the above ratio of 3:1 the shunted scale would extend from 2.67 megohms to infinity. That is, full scale deflection of the instrument would be produced by a load resistance of 2.67 megohms, and the instrument cannot measure values lower than this. In addition, the 8 megohms mark on the shunted scale would correspond with the 24 megohm mark on the unshunted scale. An instrument having such a shunted scale has two grave defects. The scale does not extend back to zero and only about one sixth of it is useful, the remaining five sixths merely overlapping the unshunted scale.

Any attempt to improve matters by decreasing the shunting resistance and thus increasing the shunt-ratio would immediately overload the instrument, leading to excessive heating and, in the case of a hand-generator, making the instrument almost impossible to use because of the difficulty of driving the generator.

The purpose of the invention is to provide a form of connection which allows of lower scale readings without the above drawbacks. A load-limiting resistance might be connected in the armature circuit of the generator, but that would give rise to a severe voltage drop on both ranges which is, of course, highly undesirable.

According to the present invention, a shunt is provided to be connected across the deflecting coil and only a part of the limiting resistance in the deflecting circuit; the part of the resistance which is shunted is controlled by the maximum permissible load on the generator and, to some extent, by the desired position of the zero on the lower reading scale, for if only the deflecting coil of the instrument were shunted, it would be found that while the maximum load would be less than the limiting value, the zero would be shifted to an undesirable position along the scale for the range giving lower scale readings.

The best conditions provided by the invention can be appreciated most clearly by consideration of the following examples in conjunction with the accompanying drawings, in which:

Figure 1 is a circuit diagram of a common insulation testing ohmmeter having a crossed-coil movement, modified in accordance with the invention;

Figure 2 shows the scales used for the unshunted and shunted ranges on one particular instrument; and Figure 3 shows the corresponding scales for another instrument.

Referring first to Figure 1, the instrument includes a hand-driven generator G, supplying current to two crossed coils C and D. For convenience, these are shown as mounted at right angles, but, in practice, the angle between them will be varied according to the characteristics of the instrument desired. The coil C, which is the control coil, is connected in series with a resistance R across the generator G. The coil D, which is the deflection coil, is connected in series with a resistance consisting of two parts A and B and is also in series with the resistance to be measured which is connected between the output terminals L and E of the instrument. In use, the two coils C and D turn together until the resultant magnetic field produced by them is aligned with the axis of that produced by the permanent magnet of the instrument. The resultant angular position of the moving system, indicated by a pointer on a suitable scale, is thus a measure of the ratio between the currents in the two coils and therefore the value of the resistance under test.

In order to obtain the lower range of the instrument, it has hitherto been the practice to shunt the deflection coil and the whole of the limiting resistance by means of a resistance such as S' shown by the dotted lines, with the attendant disadvantages already described. In accordance with the invention, a resistance S is provided, which can be connected in circuit when desired by means of a switch P, to shunt the deflection coil D and the part A only of the limiting resistance, the part B remaining unshunted.

The values of the parts A and B of the limiting resistance and of the shunt S may be calculated to give the best results in any particular case. The method of calculation may best be understood by the consideration of two examples.

The typical instrument already referred to may be considered to demonstrate the advantages of connection in accordance with the invention. Details of one example of this instrument are as follows:

Supply voltage of the generator G=5,000 volts.
Resistance of the coil C and the resistance R in series=6 megohms.
Resistance of the coil D and the resistance A and B in series=2 megohms.
Minimum permissible resistance of control circuit and deflection circuit in parallell=600,000 ohms.

Therefore the minimum permissible value of the resistance of the deflection circuit alone=

$$\frac{1}{\frac{1}{600,000}-\frac{1}{6,000,000}}=666,667 \text{ ohms}$$

The lower scale in Figure 2 is the unshunted scale of the instrument, design consideration restricting the range of movement of the pointer to about 60 degrees. The unshunted scale extends from 8 megohms to infinity. The shunted scale is required to extend back to zero, and in order to make the scale as long as possible, this zero should coincide with the 8 megohms mark on the unshunted scale. To make this possible, since the two readings correspond to the same position of the pointer, it is clearly necessary that the current in the deflection coil should be the same in each case. The current in the deflecting coil when the instrument is reading 8 megohms on the unshunted scale is given by $$\frac{5\times10^3}{(8+2)\times10^6}=5\times10^{-4} \text{ amperes}$$

The current must therefore have this same value when the instrument is reading zero on the shunted scale. The maximum permissible current in the deflection circuit under these conditions is given by $$\frac{5\times10^3}{666,667}=75\times10^{-4} \text{ amperes}$$

Therefore the maximum obtainable shunt ratio is 75:5=15:1.

If the resistance of the deflection coil D and the resistance A in series $=a$ megohms, that of the resistance B$=b$ megohms and that of the shunting resistance S$=s$ megohms, then the following two equations may be derived:

On the unshunted range: $a+b=2$     (1)
On the shunted range (when the coil D and the resistance A are shunted in the ratio 15:1)

$$\frac{a}{15}+b=.6667 \quad (2)$$

from (1) and (2)

$$a=\frac{10}{7}=1.42857 \text{ megohms}$$

$$b=2-\frac{10}{7}=\frac{4}{7}=.57143 \text{ megohms}$$

$$s=\frac{10}{7}\times\frac{1}{14}=\frac{5}{49}=.10204 \text{ megohms}$$

$$a \text{ and } s \text{ in parallel}=\frac{1}{\frac{7}{10}+\frac{49}{5}}=\frac{2}{21}=.09524 \text{ megohms}$$

By adjusting $a$, $b$ and $s$ to these values the upper, shunted scale shown in Figure 2 is obtained. Consideration of it shows the very considerable advantages it has over the scale obtained by using a shunt for the whole of the limiting resistance. Not only does the scale obtained in accordance with the invention extend back to zero, but nearly one half of it is useful, as compared with one sixth, which was the best obtainable previously.

The advantages obtained by means of connections in accordance with the invention are even more markedly demonstrated by consideration of a second example of an instrument which is supplied with a generator voltage of 2,500 volts.

The lower of the two scales shown in Figure 3, is that corresponding to the unshunted range of the instrument. As will be seen, the minimum reading on this scale is 15 megohms.

Other details of the instrument are as follows:

Resistance of the coil D and the resistances A and B in series=1.65 megohms.
Control circuit resistance=1 megohm.
Minimum permissible total load resistance= 179,000 ohms.
Minimum resistance of the deflection circuit alone=219,080 ohms.
Maximum permissible shunt ratio (given by ratio of maximum permissible current: current flowing for zero scale reading) =

$$\frac{15+1.65}{.21908}:1=76:1$$

Equations may be derived as in Example 1, i. e.

$$a+b=1.65 \quad (1)$$

$$\frac{a}{76}+b=.21908 \quad (2)$$

From (1) and (2)

$$a=1.45 \text{ megohms} \quad b=0.20 \text{ megohms}$$

$$s=\frac{1.45}{75}=19,333 \text{ ohms}$$

By adjusting the resistance $a$, $b$ and $s$ to these values, the upper scale of Figure 3 is obtained. As may be seen, this scale extends back to zero and approximately three quarters of it, i. e. from zero to 15 megohms is useful.

Although particular reference has been made to instruments having a crossed-coil movement and the examples have been calculated for such instruments, it will be understood that the invention applies equally to instruments having a single coil, the deflection of which is limited by a spring.

I claim:

1. A multi-range instrument for the measurement of electrical resistance of the order of megohms comprising in combination, a hand-driven electric generator, a permanent magnet field system, a crossed-coil movement mounted to turn in said field system, said movement comprising a control coil supplied with a substantially constant current from said generator and a deflection coil, a pair of scales mounted in parallel concentric relationship, a pointer carried by said movement to move over said scales, a test circuit comprising in series circuit connection, said generator, said deflection coil, a first resistance, a second resistance and a pair of terminals between which the test resistance is to be connected; a shunting resistance and switching means for connecting said shunting resistance in parallel with said deflection coil and said first resistance only.

2. A multi-range instrument for the measurement of electrical resistance comprising, in combination, a permanent magnet field system, a coil mounted to turn in said field system, a pair of scales mounted in parallel concentric relationship, a pointer carried by said coil to move over said scales, a test circuit comprising, in series circuit connection, a source of direct current, said coil, a first resistance, a second resistance and a pair of terminals between which the test resistance is to be connected; a shunting resistance and switching means for connecting said shunting resistance in parallel with said deflection coil and said first resistance only, the resistance of said coil and the values of said first resistance, said second resistance and said shunting resistance being selected so as to give a high multiplication factor between said scales consistent with the maximum permissible load of said circuit, and to ensure a high fraction of usefulness of the upper range scale.

3. A multi-range instrument for the measurement of electrical resistance comprising in combination, a source of direct current, a permanent magnet field system, a crossed-coil movement mounted to turn in said field system, said movement comprising a control coil supplied with a substantially constant current from said source of current and a deflection coil, a test circuit comprising, in series circuit connection, said source of direct current, said deflection coil, a first current limiting resistance, a second current limiting resistance and means for connecting the test resistance in said circuit; a shunting resistance and switching means for connecting said shunting resistance in parallel with said deflection coil and said first current limiting resistance only, the resistance of said deflection coil and the values of said first and second current limiting resistances and of said shunting resistance being selected so as to give a high ratio between the currents flowing in said shunting resistance and in said deflection coil consistent with the maximum permissible load of said circuit.

4. In a multi-range instrument for the measurement of electrical resistance of the type in which a movable deflection coil carries a pointer which moves over a pair of scales arranged in parallel relation and in which said coil is connected in series circuit with a source of voltage, a current limiting resistance and the resistance element to be measured, and said current limiting resistance has a value adapting said instrument for use in indicating high resistance values on one of said scales, the improvement which includes an additional current limiting resistance nected in a series circuit with a source of voltage, shunting resistance, and switching means for connecting said shunting resistance in parallel with said coil and with said first limiting resistance only, thereby adapting said instrument for the indication of lower resistance values on the other scale of said pair, said shunting resistance having a resistance value such that the current in said deflection coil on zero test resistance is the same as the current on the lowest resistance value indicated on said high resistance scale.

CHARLES E. PERRY.

REFERENCES CITED

The following references are of record in the file of this patent:

UNITED STATES PATENTS

| Number | Name | Date |
|---|---|---|
| 478,098 | Evershed | July 5, 1892 |
| 1,593,024 | Macadie | July 20, 1926 |
| 1,901,344 | Horton | Mar. 14, 1933 |
| 2,157,973 | Wenger | May 9, 1939 |
| 2,188,588 | Antranikian | Jan. 30, 1940 |